US010274713B2

(12) United States Patent
Kobayashi et al.

(10) Patent No.: US 10,274,713 B2
(45) Date of Patent: Apr. 30, 2019

(54) MICROSCOPE INCLUDING A WHITE LIGHT EMITTING DIODE AND A LIGHT SHIELDING MEMBER THAT CAN PREVENT EXCITATION LIGHT FROM REACHING THE WHITE LIGHT EMITTING DIODE

(71) Applicant: OLYMPUS CORPORATION, Hachioji-shi, Tokyo (JP)

(72) Inventors: Shintaro Kobayashi, Hachioji (JP); Hironori Utsugi, Hachioji (JP); Minoru Hanaoka, Nagano (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/673,386

(22) Filed: Aug. 9, 2017

(65) Prior Publication Data

US 2018/0045943 A1  Feb. 15, 2018

(30) Foreign Application Priority Data

Aug. 9, 2016  (JP) .................................. 2016-156813

(51) Int. Cl.
*G02B 21/06* (2006.01)
*G02B 21/08* (2006.01)
(Continued)

(52) U.S. Cl.
CPC ........... *G02B 21/088* (2013.01); *G02B 21/06* (2013.01); *G02B 21/16* (2013.01); *G02B 21/26* (2013.01)

(58) Field of Classification Search
CPC .......................... G02B 21/00; G02B 21/0004; G02B 21/0008; G02B 21/002; G02B 21/0024;
(Continued)

(56) References Cited

U.S. PATENT DOCUMENTS 9,007,684 B2   4/2015 Hayashi
9,297,992 B2   3/2016 Ganser et al.
(Continued)

FOREIGN PATENT DOCUMENTS

JP           02140514 U    11/1990
JP         2013029836 A     2/2013
JP         2013142829 A     7/2013

*Primary Examiner* — Arnel C Lavarias
(74) *Attorney, Agent, or Firm* — Holtz, Holtz & Volek PC

(57) ABSTRACT

A microscope includes a stage on which a specimen is configured to be placed, an epi-illumination optical system having a fluorescence illumination light source configured to irradiate the specimen with excitation light of a predetermined wavelength, a transmitted-light illumination optical system, and a light shielding member. The transmitted-light illumination optical system includes a transmitted-light illumination light source having a white LED, and a condenser having a condenser lens configured to collect light emitted from the transmitted-light illumination light source onto the specimen and configured to move in a direction orthogonal to an illumination optical path so as to be insertable onto and removable from the illumination optical path. The light shielding member is configured to move in the direction orthogonal to the illumination optical path along with the condenser lens to block incidence of the excitation light from the epi-illumination optical system to the transmitted-light illumination optical system.

3 Claims, 12 Drawing Sheets

(51) Int. Cl.
*G02B 21/16* (2006.01)
*G02B 21/26* (2006.01)

(58) Field of Classification Search
CPC ............ G02B 21/0032; G02B 21/0052; G02B
21/0064; G02B 21/0076; G02B 21/06;
G02B 21/08; G02B 21/082; G02B
21/086; G02B 21/088; G02B 21/12;
G02B 21/16; G02B 21/36; G02B 21/361;
G02B 19/00; G02B 19/0004; G02B
19/0009; G02B 19/0014; G02B 19/0033;
G02B 19/0047; G02B 19/0052; G02B
19/0057; G02B 19/0061; G02B 19/0066;
G02B 19/0095
USPC ....... 359/362, 363, 368, 369, 385, 388, 389,
359/390
See application file for complete search history.

(56) References Cited

U.S. PATENT DOCUMENTS

| 10,036,880 B2* | 7/2018 | Kawano | G02B 21/24 |
| 2011/0102571 A1* | 5/2011 | Yoneyama | G02B 21/367 |
| | | | 348/79 |
| 2017/0090173 A1* | 3/2017 | Kitahara | G02B 5/005 |

* cited by examiner

MICROSCOPE INCLUDING A WHITE LIGHT EMITTING DIODE AND A LIGHT SHIELDING MEMBER THAT CAN PREVENT EXCITATION LIGHT FROM REACHING THE WHITE LIGHT EMITTING DIODE

CROSS-REFERENCE TO RELATED APPLICATIONS

This application is based upon and claims the benefit of priority from Japanese Patent Application No. 2016-156813, filed on Aug. 9, 2016, the entire contents of which are incorporated herein by reference.

BACKGROUND

1. Technical Field

The disclosure relates to a microscope including an epi-illumination optical system for fluorescence observation and a transmitted-light illumination optical system using a white LED as a light source.

2. Related Art

Conventionally, microscopes have been known that are capable of observation by switching between an epi-illumination optical system and a transmitted-light illumination optical system according to various observation methods and specimens.

In recent years, microscopes using a white light emitting diode (LED), instead of a halogen lamp, as a light source of the transmitted-light illumination optical system have increased. However, when fluorescence observation is performed with epi-illumination optical system in a case where a light source of the epi-illumination optical system is the white LED having an LED element of blue or the like and a phosphor emitting fluorescence by excitation light irradiated by the LED element, a part of the excitation light from the fluorescence epi-illumination with which a specimen is irradiated is transmitted through the specimen and is incident to the white LED which is the light source of the transmitted-light illumination optical system, the phosphor is excited, and the phosphor emits fluorescence. Accordingly, the fluorescence emitted by the phosphor of the transmitted-light illumination is added at the time of epifluorescence observation, and is detected as noise.

In order to address such a situation, proposed are a microscope in which incidence of light from an epi-illumination optical system to a transmitted illumination optical system is limited when transmitted illumination is turned off, and the incidence limitation of light is removed when the transmitted illumination is turned on (See JP 2013-142829 A), and a microscope in which a correction filter is insertable into and removable from a transmitted-light illumination optical system, the correction filter having a spectral transmission profile which minimizes transmission of a wavelength that gives a maximum sensitivity of a spectrum of a white LED (See JP 2013-29836 A).

In the microscopes described above, it is possible to prevent irradiation of excitation light to the phosphor by a shutter or a correction filter, but it is necessary to change an optical member such as a condenser lens to an expensive member for low autofluorescence because the shutter or the correction filter is arranged immediately before the phosphor.

In addition, proposed is a microscope which prevents autofluorescence without changing an optical member to an expensive member for low autofluorescence by arranging a condenser lens immediately before a specimen so as to be insertable onto and removable from an optical path of a transmitted-light illumination optical system and by inserting a light shielding member for shielding fluorescent illumination immediately before the specimen when the condenser lens is removed from the optical path (See Japanese Utility Model Application Publication No. H02-140514).

SUMMARY

In some embodiments, a microscope includes a stage on which a specimen is configured to be placed, an epi-illumination optical system having a fluorescence illumination light source configured to irradiate the specimen with excitation light of a predetermined wavelength, a transmitted-light illumination optical system, and a light shielding member. The transmitted-light illumination optical system includes a transmitted-light illumination light source having a white LED, and a condenser having a condenser lens configured to collect light emitted from the transmitted-light illumination light source onto the specimen and configured to move in a direction orthogonal to an illumination optical path so as to be insertable onto and removable from the illumination optical path. The light shielding member is configured to move in the direction orthogonal to the illumination optical path along with the condenser lens to block incidence of the excitation light from the epi-illumination optical system to the transmitted-light illumination optical system.

The above and other features, advantages and technical and industrial significance of this invention will be better understood by reading the following detailed description of presently preferred embodiments of the invention, when considered in connection with the accompanying drawings.

DETAILED DESCRIPTION

Exemplary embodiments of the present invention will be described below in detail with reference to the drawings. The present invention is not limited to the embodiments. The same reference signs are used to designate the same elements throughout the drawings.

First Embodiment

Figure 1:
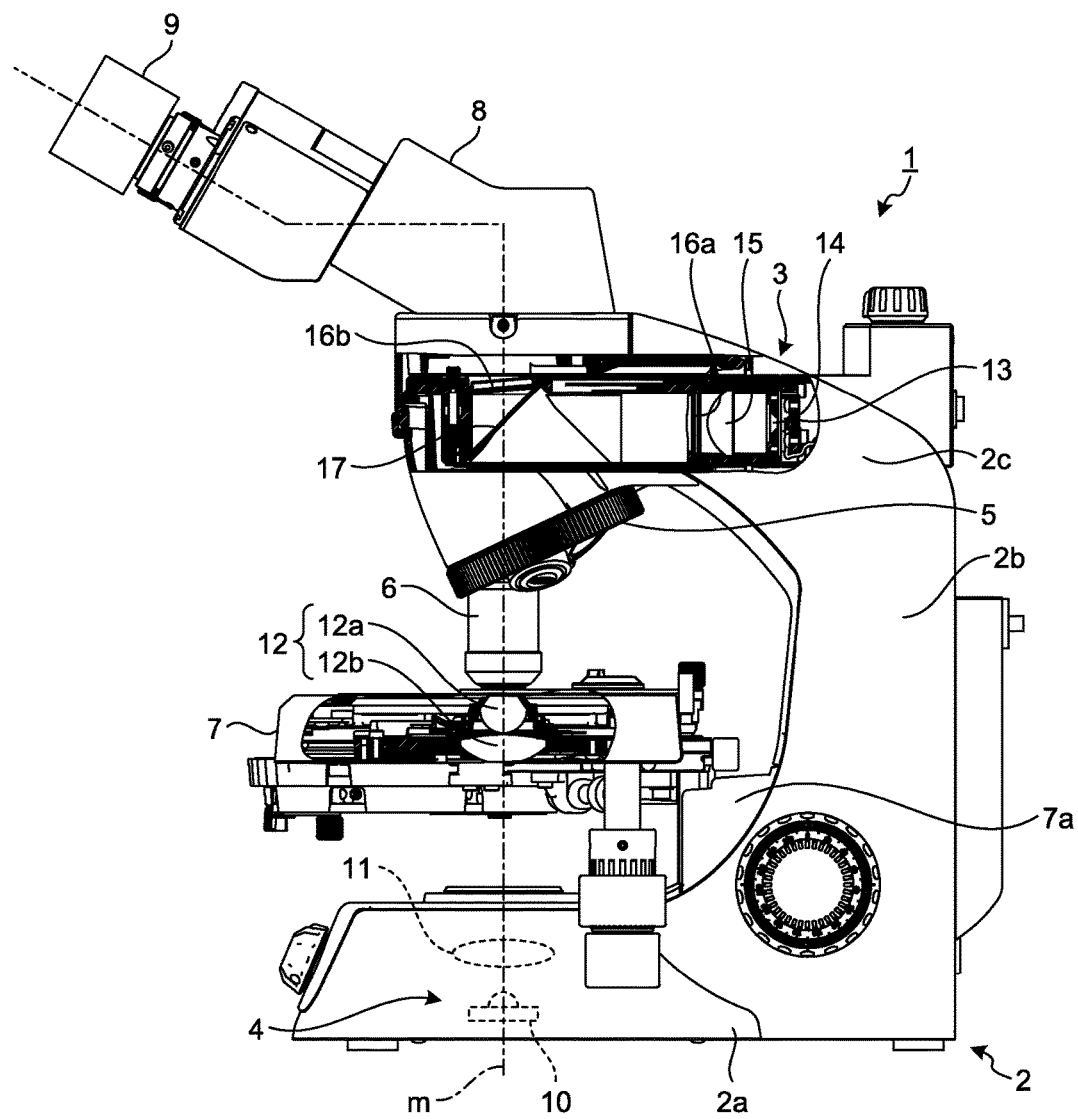
FIG. 1 is a side view illustrating the overall configuration of a microscope according to a first embodiment of the present invention.

FIG. 1 is a side view illustrating the overall configuration of a microscope according to a first embodiment of the present invention. In FIG. 1, an arm portion 2c and a stage 7 are illustrated as a partial cross section for the purpose of understanding the first embodiment of the present invention. A microscope 1 according to the first embodiment of the present invention includes a main body 2, an epi-illumination optical system 3, and a transmitted-light illumination optical system 4.

The main body 2 includes a base portion 2a, a pillar portion 2b erected on a back side of the base portion 2a, and the arm portion 2c supported by the pillar portion 2b and extending toward a front side. The base portion 2a is a portion directly placed on a desk, for example, where the microscope 1 is placed, and the transmitted-light illumination optical system 4 is arranged inside the base portion 2a. The base portion 2a holds the stage 7 via a stage holding member 7a. The stage 7 includes an upper stage on which a specimen S is configured to be placed and a lower stage 7b (see FIG. 4) held by the pillar portion 2b of the main body 2 via the stage holding member 7a.

The pillar portion 2b is erected on the back side of the base portion 2a and integrated with the base portion 2a at a lower end portion. The arm portion 2c horizontally extends from an upper end of the pillar portion 2b toward the front side of the microscope 1 so as to face the base portion 2a. A revolver 5 is attached to a lower side of the arm portion 2c, and a lens barrel 8 and an eyepiece 9 are attached to an upper side thereof. The epi-illumination optical system 3 is arranged in a hollow inner portion of the arm portion 2c. The front side of the microscope 1 faces a user when the microscope 1 is in use. The back side of the microscope 1 is an opposite side of the microscope 1.

The revolver 5 is rotatably held with respect to the arm portion 2c and arranges an objective lens 6 above the specimen S. The objective lens 6 is replaceably mounted to the revolver 5 together with the other objective lens 6 having a different magnification (observation magnification), and is inserted on an optical axis m according to rotation of the revolver 5 such that the objective lens used for observation of the specimen S is alternatively switched.

The epi-illumination optical system 3 is an optical element for epi-illumination observation. The epi-illumination optical system 3 forms epi-illumination by arranging a field diaphragm 14, a collector lens 15, an excitation filter 16a, and a dichroic mirror 17 between a fluorescent illumination light source 13 and an upper surface of the specimen S on the stage 7. The epi-illumination optical system 3 forms Kohler illumination in the state of being positioned with respect to the optical axis m, and the fluorescent illumination light source 13 and an exit pupil of the objective lens 6, and the field diaphragm 14 and the specimen S are positioned in a conjugate relationship. Illumination light including a specific wavelength component irradiated from the fluorescent illumination light source 13 including a light emitting diode passes through the field diaphragm 14 and the collector lens 15, and only an excitation wavelength necessary for a fluorochrome stained on the specimen S is transmitted by the excitation filter 16a. The transmitted illumination light is reflected toward the objective lens 6 by the dichroic mirror 17 and is emitted to the specimen S after being transmitted through the objective lens 6. The fluorochrome stained on the specimen S is excited, and fluorescence with a wavelength component longer than the excitation light is emitted from the specimen S irradiated with the illumination light. This fluorescence is transmitted through the objective lens 6 and the dichroic mirror 17, and only a fluorescence wavelength necessary for observation is transmitted by an absorption filter 16b and passes through a tube lens and a prism (not illustrated) arranged inside the lens barrel 8 to form an image, thereby enabling visual observation through the eyepiece 9.

The transmitted-light illumination optical system 4 is an optical element for transmitted-light observation. Transmitted-light illumination is configured by sequentially arranging a collector lens 11 and a condenser 12 between a transmitted-light illumination light source 10 and a lower surface of the specimen S placed on the stage 7. Illumination light for transmission observation output from the transmitted-light illumination light source 10 sequentially passes through the collector lens 11 and a first condenser lens 12a and a second condenser lens 12b, which constitute the condenser 12, and is emitted onto and transmitted through the specimen S. The light transmitted through the specimen S is transmitted through the objective lens 6 and the dichroic mirror 17, passes through the tube lens and the prism (not illustrated) arranged inside the lens barrel 8 to form an image, and can be observed through the eyepiece 9.

Figure 2:
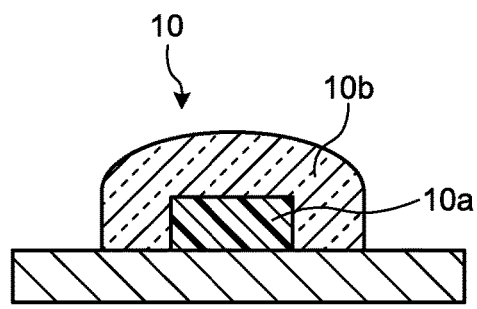
FIG. 2 is a schematic view for describing a white LED using a blue LED.
Figure 3:
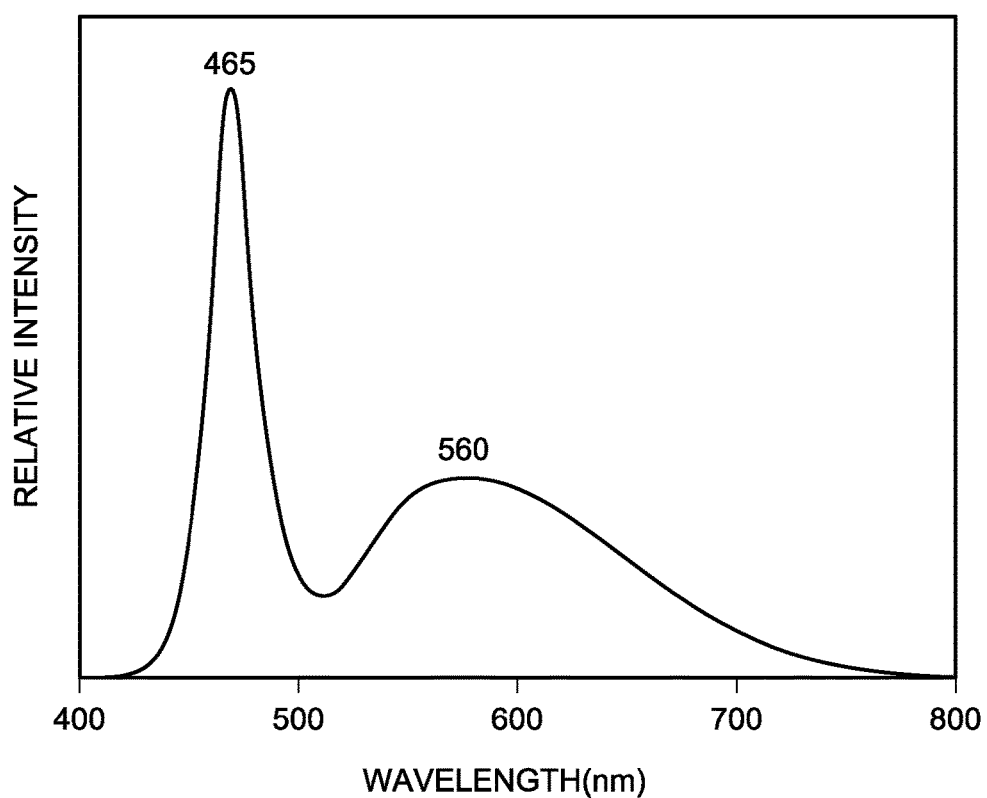
FIG. 3 is a graph for describing an emission spectrum of the white LED using the blue LED.

The transmitted-light illumination light source 10 is a white LED having a light emitting element and a phosphor, such as a blue LED and a yellow phosphor, or a blue LED and red and green phosphors. FIG. 2 is a schematic view for describing the white LED using the blue LED. FIG. 3 is a graph for describing an emission spectrum of the white LED using the blue LED. As illustrated in FIG. 2, a blue LED 10a is sealed with a yellow phosphor 10b in the transmitted-light illumination light source 10 using the blue LED 10a. When the blue LED 10a emits blue excitation light (excitation light having a peak at 465 nm in FIG. 3), the yellow phosphor 10b emits yellow fluorescence (fluorescence having a peak at 560 nm in FIG. 3) due to the blue excitation light, and white light is irradiated due to mixing of the blue excitation light and the yellow fluorescence.

Figure 4:
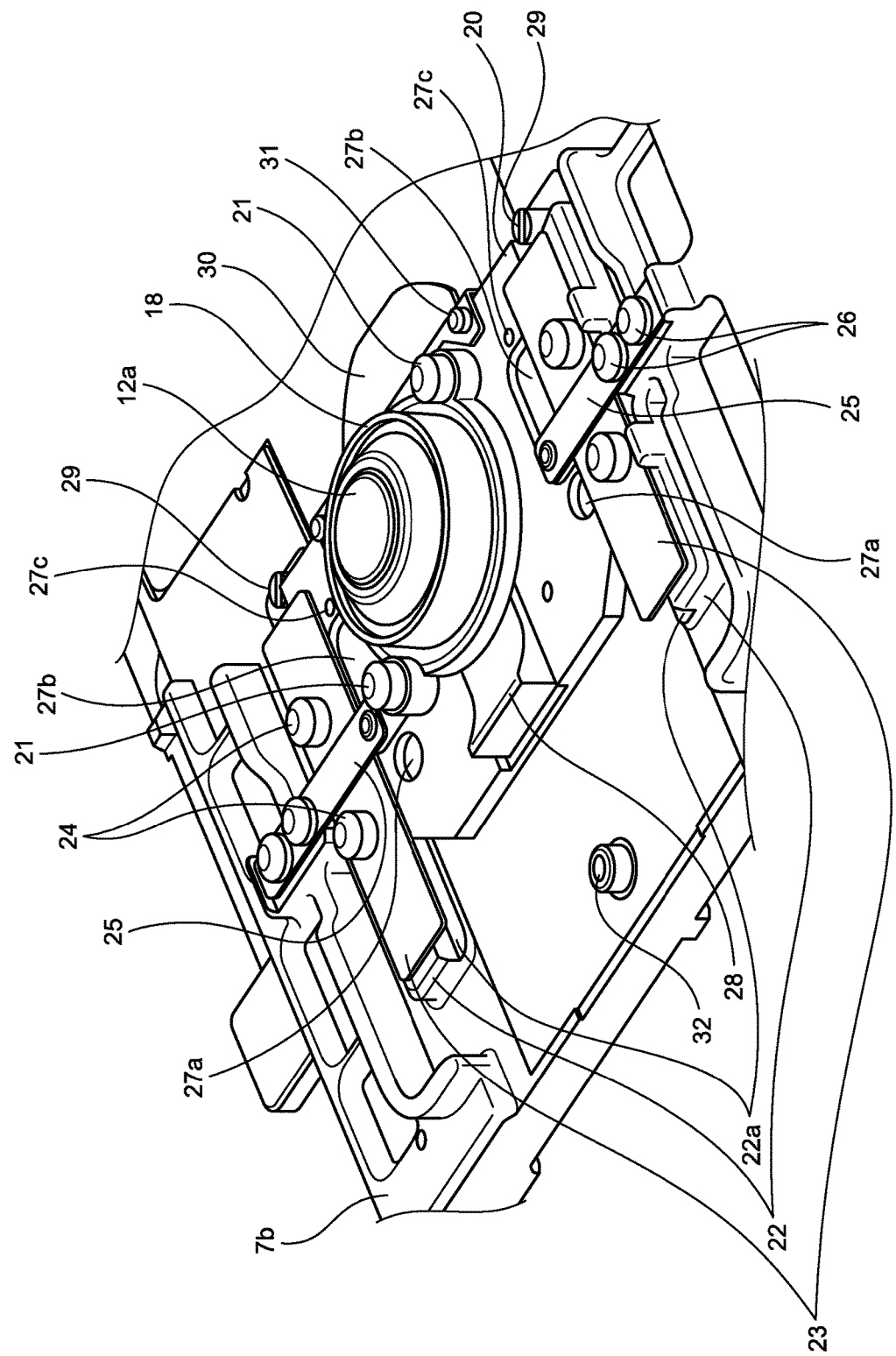
FIG. 4 is a perspective view illustrating an internal structure of a stage used in the microscope of FIG. 1.
Figure 5:
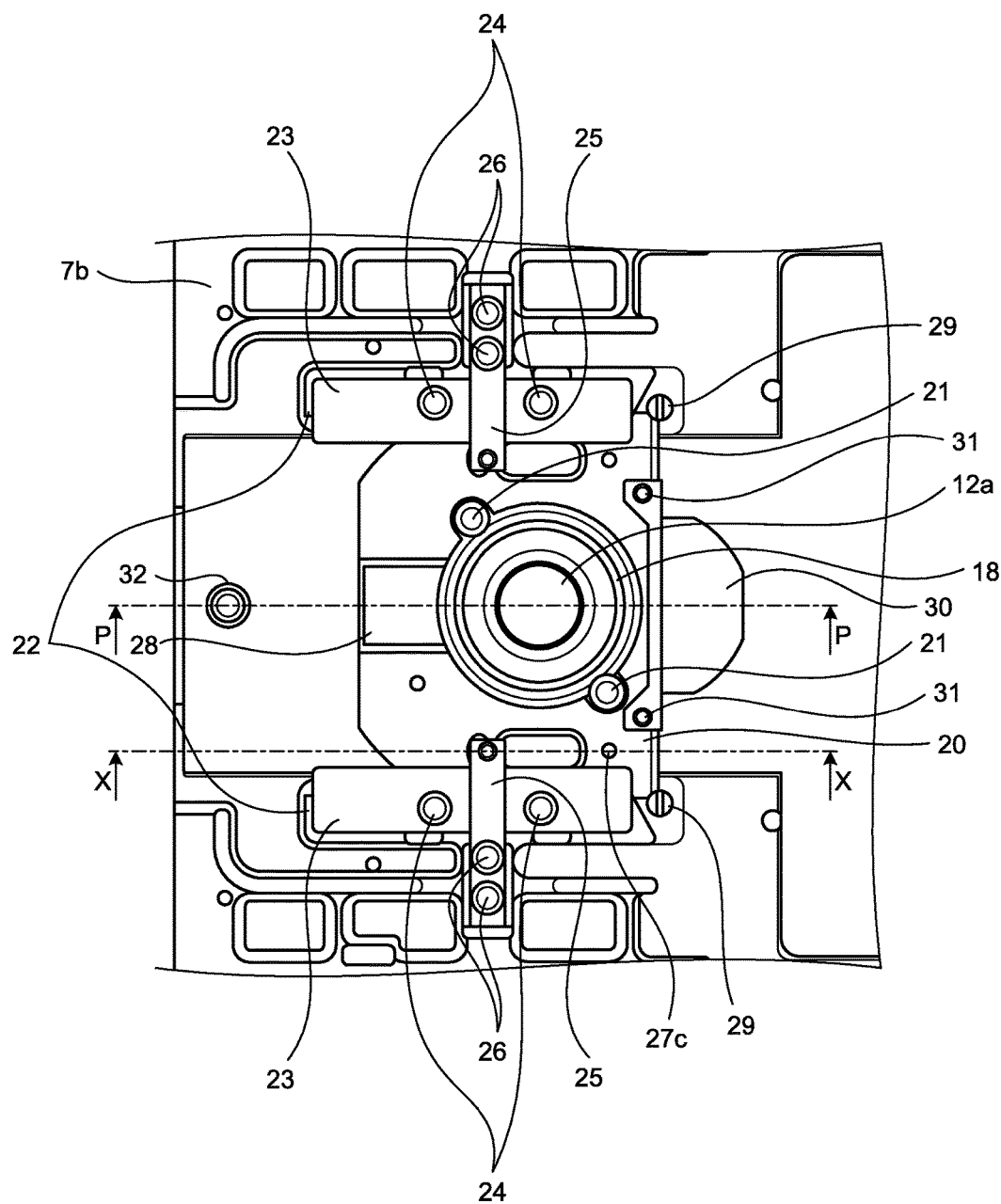
FIG. 5 is a top view of the internal structure of the stage.
Figure 6:
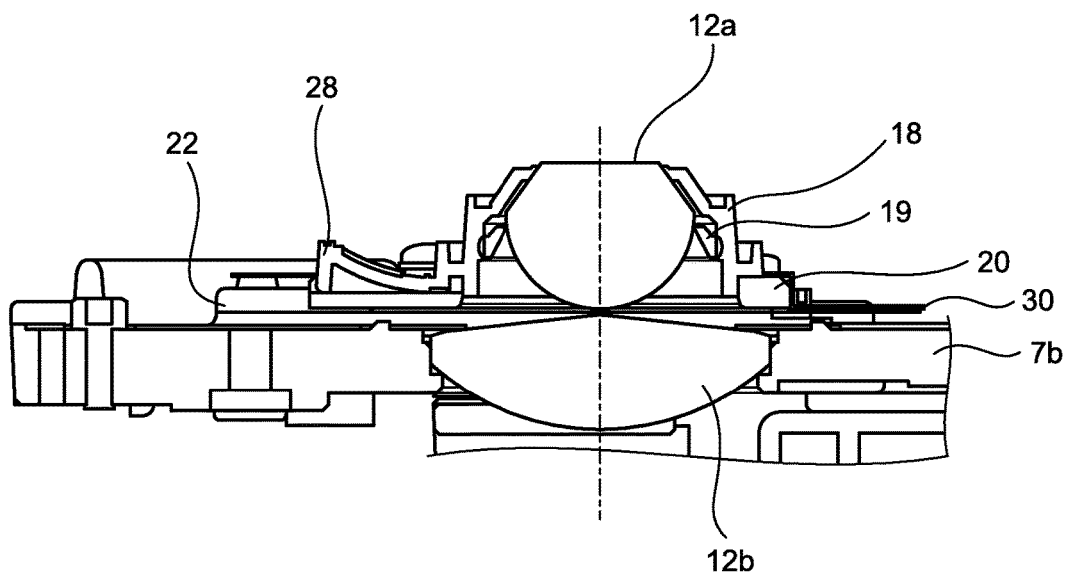
FIG. 6 is a cross-sectional view taken along a line PP of FIG. 5.
Figure 7:
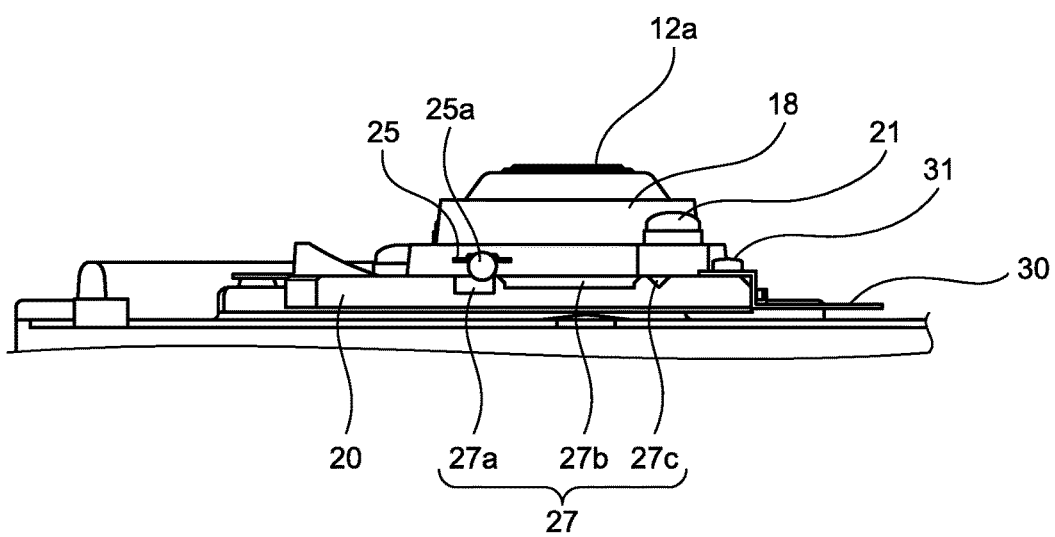
FIG. 7 is a cross-sectional view taken along a line XX of FIG. 5.

Next, blocking of illumination light from the epi-illumination optical system to the transmitted-light illumination optical system in the microscope 1 according to the first embodiment will be described with reference to the drawings. FIG. 4 is a perspective view illustrating an internal structure of the stage 7 used in the microscope 1 according to the first embodiment of the present invention. FIG. 5 is a top view of the internal structure of the stage 7. FIG. 6 is a cross-sectional view taken along a line PP of FIG. 5. FIG. 7 is a cross-sectional view taken along a line XX of FIG. 5. In FIGS. 4 to 7, the upper stage is not shown but the lower stage 7b in which the first condenser lens 12a is arranged is mainly shown for the purpose of understanding the first embodiment of the present invention.

As illustrated in FIG. 6, the first condenser lens 12a is pressed by a pressing tube 19 and held by a condenser lens frame 18. The condenser lens frame 18 is attached to a plate-shaped slide portion 20 using a screw 21 or the like.

A pair of guide portions 22 are arranged in parallel in a front-back direction (from the front side to the back side) on the lower stage 7b, and an end portion of the slide portion 20 is arranged on a concave portion 22a formed in the guide portion 22. A cover 23 for holding the end portion of the slide portion 20 together with the concave portion 22a is fixed to an upper surface of the guide portion 22 using a screw 24 or the like. A spring member 25 is fixed to the lower stage 7b using a screw 26 or the like so as to be orthogonal to the guide portion 22, and the spring member 25 presses the slide portion 20 downward from above the cover 23. A ball 25a is attached to an end portion of the spring member 25, and the ball 25a moves on a groove portion 27 formed at the end portion of the slide portion 20. The groove portion 27 includes a first groove portion 27a having an elliptical column shape, a second groove portion 27b having a substantially rectangular column shape, and a third groove portion 27c having a conical shape, and a click mechanism is configured by the first groove portion 27a to the third groove portion 27c.

A knob 28 is formed on the front side of the slide portion 20, and the first condenser lens 12a is inserted or removed into or from the optical axis m as a finger is placed on the knob 28 to move the slide portion 20 in parallel with the guide portion 22. The first condenser lens 12a is positioned on the optical axis m in a state in which the slide portion 20 is moved to the back side and the ball 25a of the spring member 25 rides on a corner portion of the first groove portion 27a (see FIG. 7), that is, by pressing the slide portion 20 against a positioning pin 29 (see FIG. 5).

Figure 8:
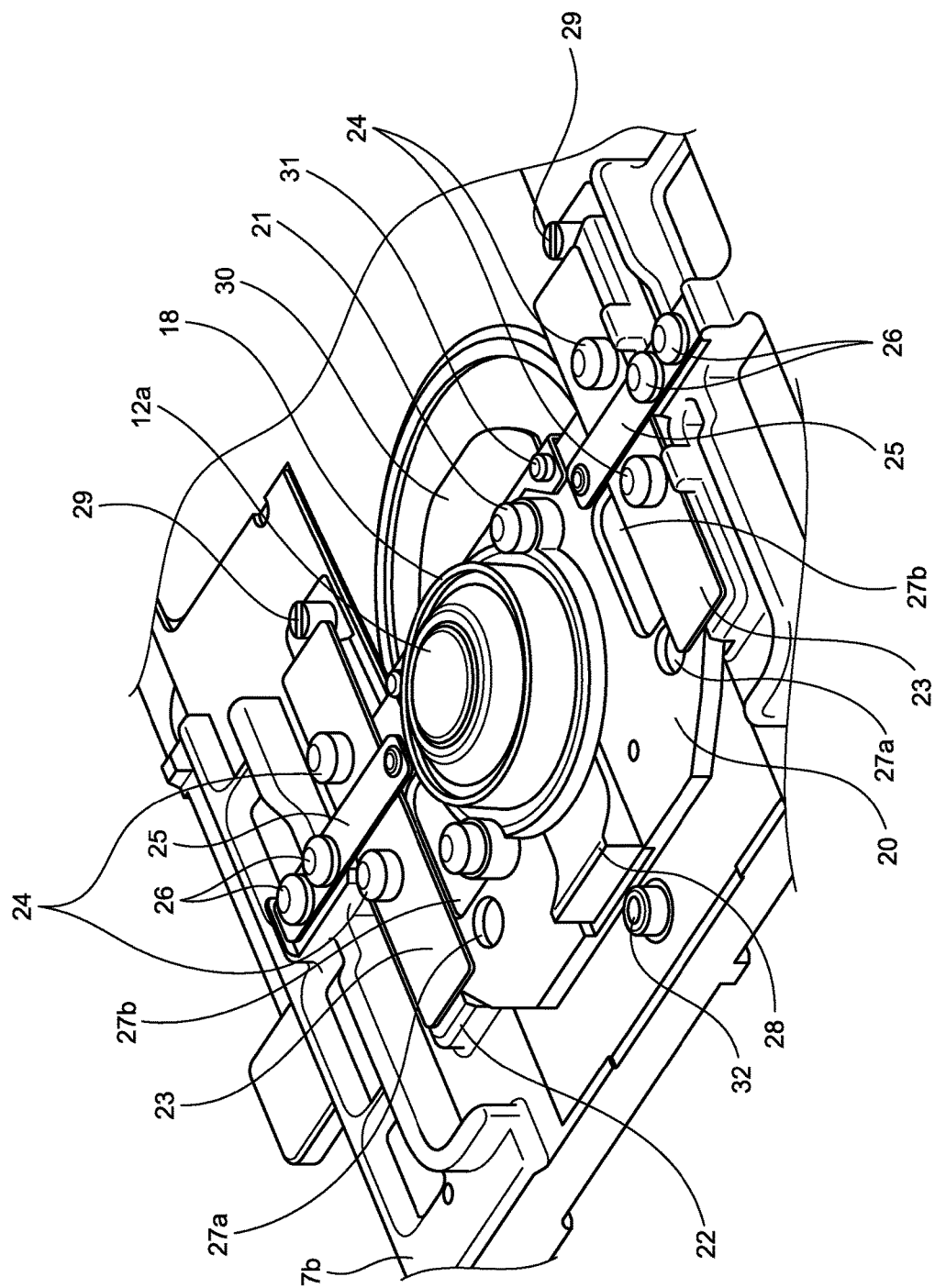
FIG. 8 is a perspective view when a first condenser lens of FIG. 4 deviates from an optical axis.
Figure 9:
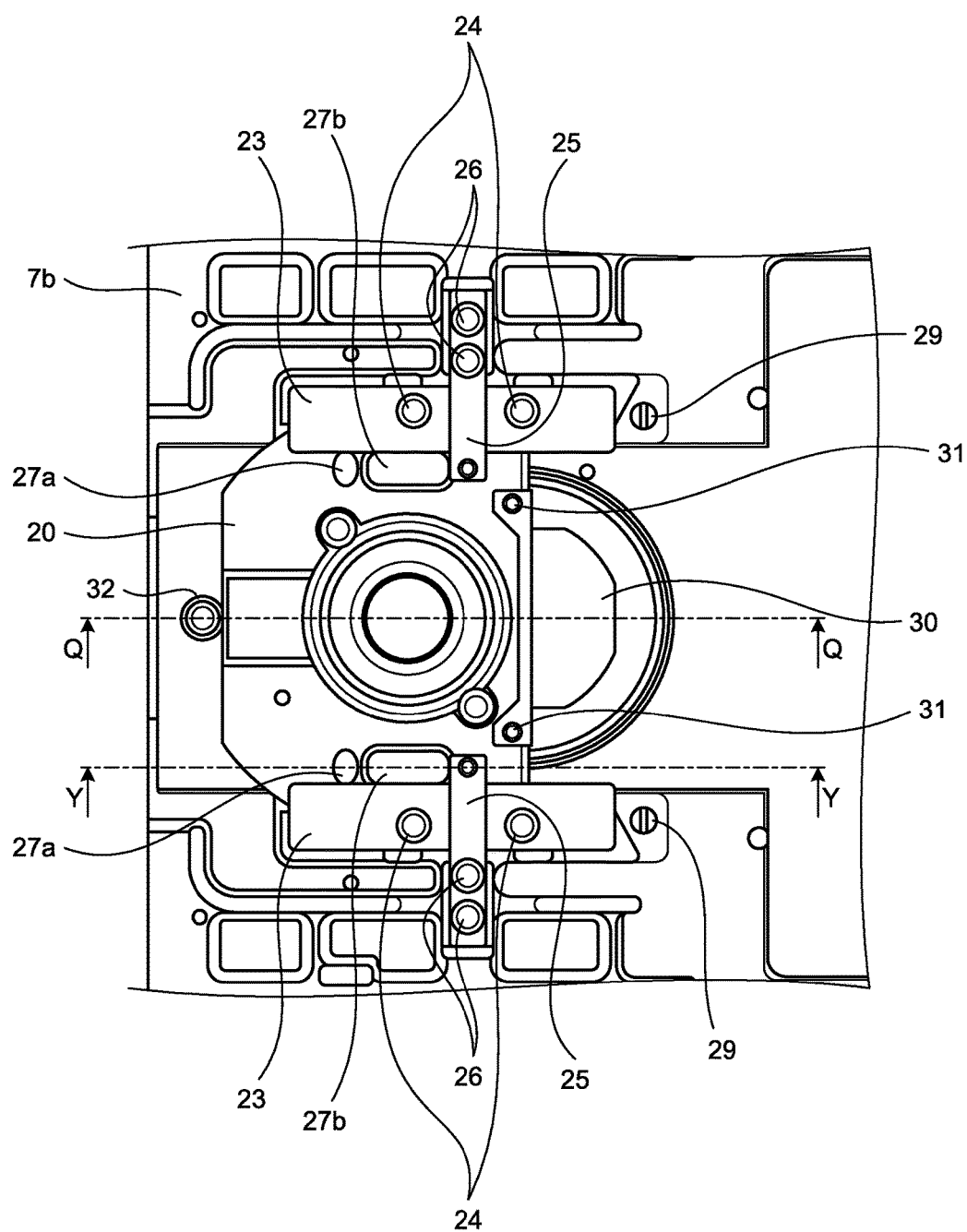
FIG. 9 is a top view of FIG. 8.
Figure 10:
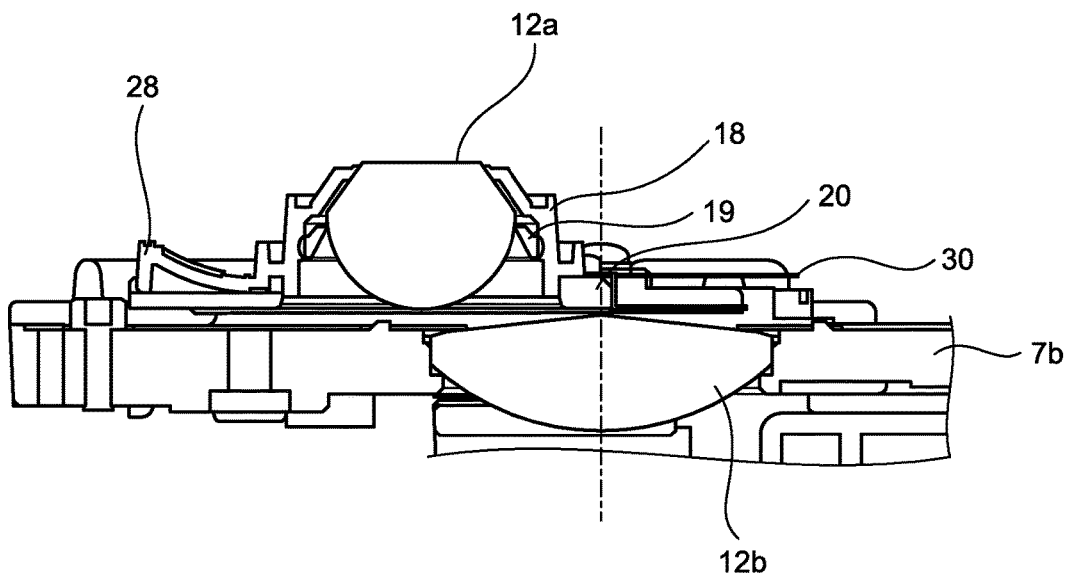
FIG. 10 is a cross-sectional view taken along a line QQ of FIG. 9.
Figure 11:
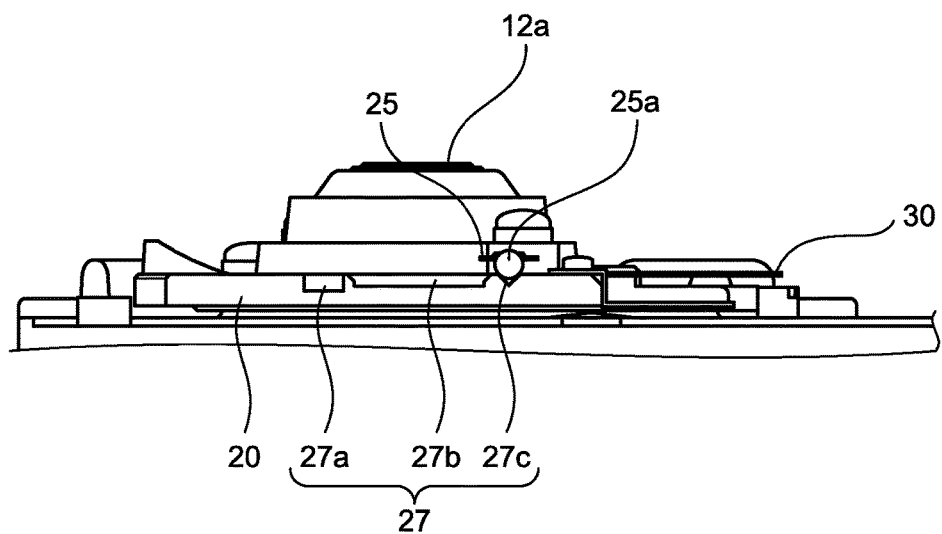
FIG. 11 is a cross-sectional view taken along a line YY of FIG. 9.

A light shielding plate 30 made of metal is attached to the back side of the slide portion 20 using a screw 31 or the like. FIG. 8 is a perspective view when the first condenser lens 12a of FIG. 4 deviates from the optical axis m. FIG. 9 is a top view of FIG. 8. FIG. 10 is a cross-sectional view taken along a line QQ of FIG. 9. FIG. 11 is a cross-sectional view taken along a line YY in FIG. 9.

When the finger is placed on the knob 28 to move the slide portion 20 to the front side in parallel to the guide portion 22, the first condenser lens 12a deviates from the optical axis m, and the light shielding plate 30 is arranged on the optical axis m. When the slide portion 20 is moved to the front side and the ball 25a of the spring member 25 is inserted into the third groove portion 27c (see FIG. 11), the first condenser lens 12a is located at the deviated position and the light shielding plate 30 is arranged on the optical axis m. A stopper 32 is arranged on the lower stage 7b so that the movement of the slide portion 20 is limited by abutment of the slide portion 20 on the stopper 32, and the ball 25a is drawn into the third groove portion 27c and positioned even when the ball 25a of the spring member 25 rides on the front side from the third groove portion 27c. It is possible to block the incidence of the excitation light from the epi-illumination optical system 3 to the transmitted-light illumination optical system 4 by arranging the light shielding plate 30 on the optical axis m. Accordingly, it is possible to prevent emission of the yellow phosphor 10b of the transmitted-light illumination light source 10 and autofluorescence of the optical member such as the second condenser lens 12b caused by the excitation light incident to the transmitted-light illumination optical system 4.

In the first embodiment, it is possible to prevent the excitation light from being incident to the transmitted-light illumination optical system 4 from the epi-illumination optical system 3 by moving the slide portion 20, which holds the first condenser lens 12a via the condenser lens frame 18, and the light shielding plate 30 attached to the slide portion 20 in the direction orthogonal to the optical axis m on the guide portion 22 formed on the lower stage 7b. Accordingly, it is possible to prevent the emission of the yellow phosphor 10b of the transmitted-light illumination light source 10 and the autofluorescence of the optical member such as the second condenser lens 12b, and it is possible to perform fluorescent observation with no noise. Since the slide portion 20 and the light shielding plate 30 are moved in the direction orthogonal to the optical axis m in the first embodiment, it is possible to arrange the slide portion 20 and the light shielding plate 30 in the vicinity of the specimen S, that is, on the lower stage 7b even in the microscope 1 provided with a high NA illumination optical system, and it is unnecessary to change the optical member such as the second condenser lens 12b to an expensive one for low autofluorescence, which is excellent in cost.

Although the condenser includes the first condenser lens 12a that is insertable onto and removable from the illumination optical path by moving in the direction orthogonal to the illumination optical path and the second condenser lens 12b that is fixed on the illumination optical path in the first embodiment, a single condenser lens may be employed that is insertable onto and removable from the illumination optical path by moving in the direction orthogonal to the illumination optical path.

Second Embodiment

Figure 12:
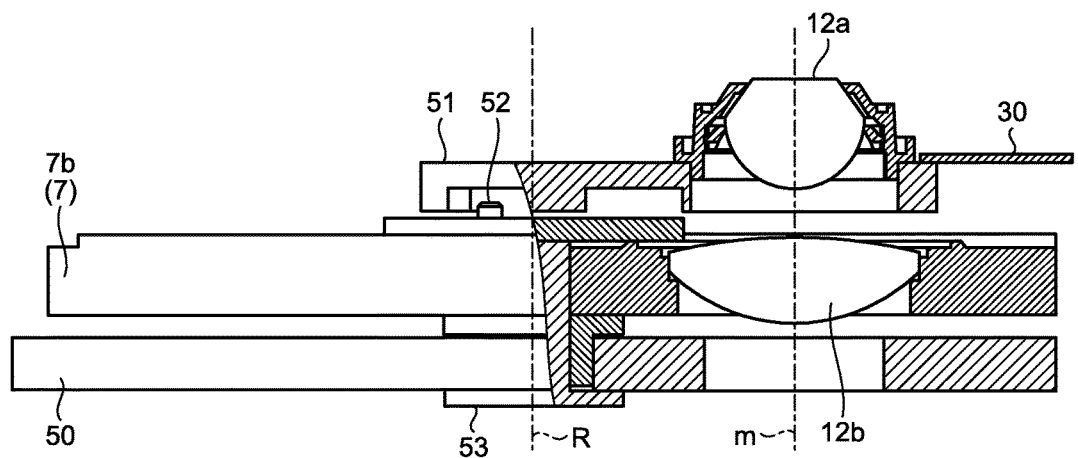
FIG. 12 is a partial cross-sectional view illustrating an internal structure of a stage according to a second embodiment of the present invention (a first condenser lens is on an optical axis)
Figure 13:
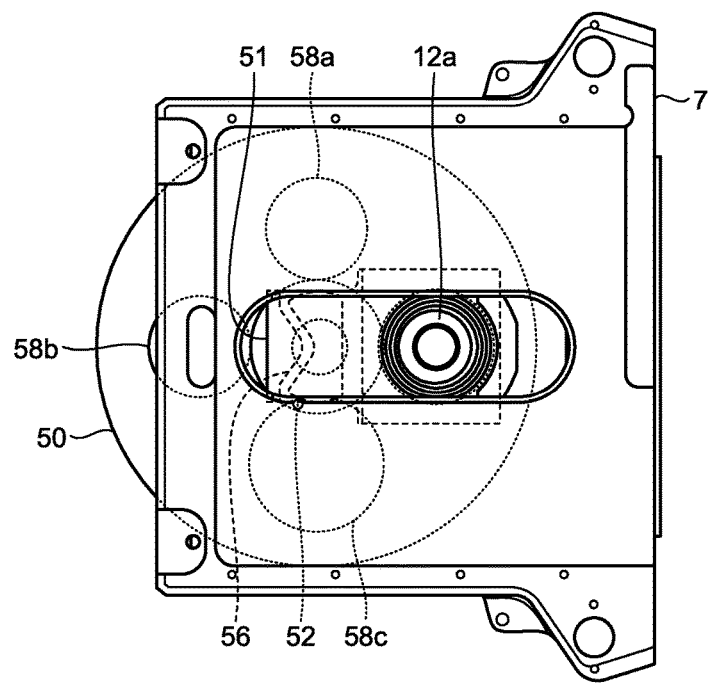
FIG. 13 is a top view of the stage at a position of a turret in FIG. 12.
Figure 14:
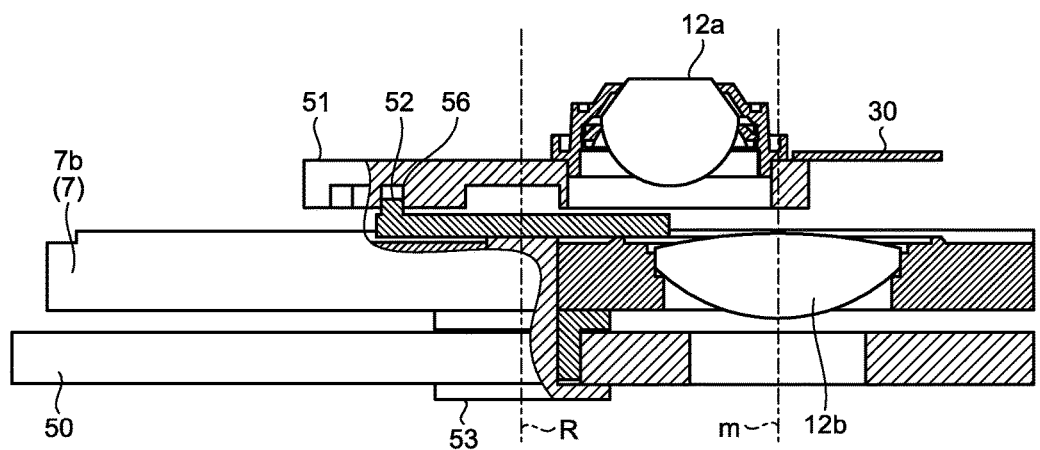
FIG. 14 is a partial cross-sectional view illustrating an internal structure of the stage when the first condenser lens deviates from the optical axis.
Figure 15:
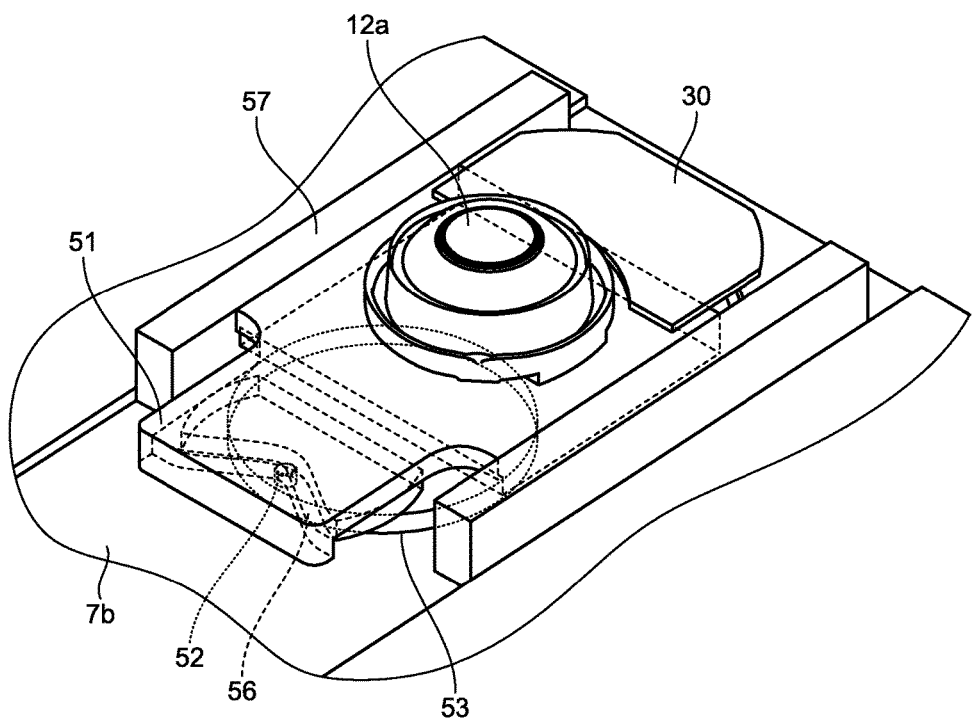
FIG. 15 is a perspective view of the internal structure of the stage at the position of the turret in FIG. 14.
Figure 16:
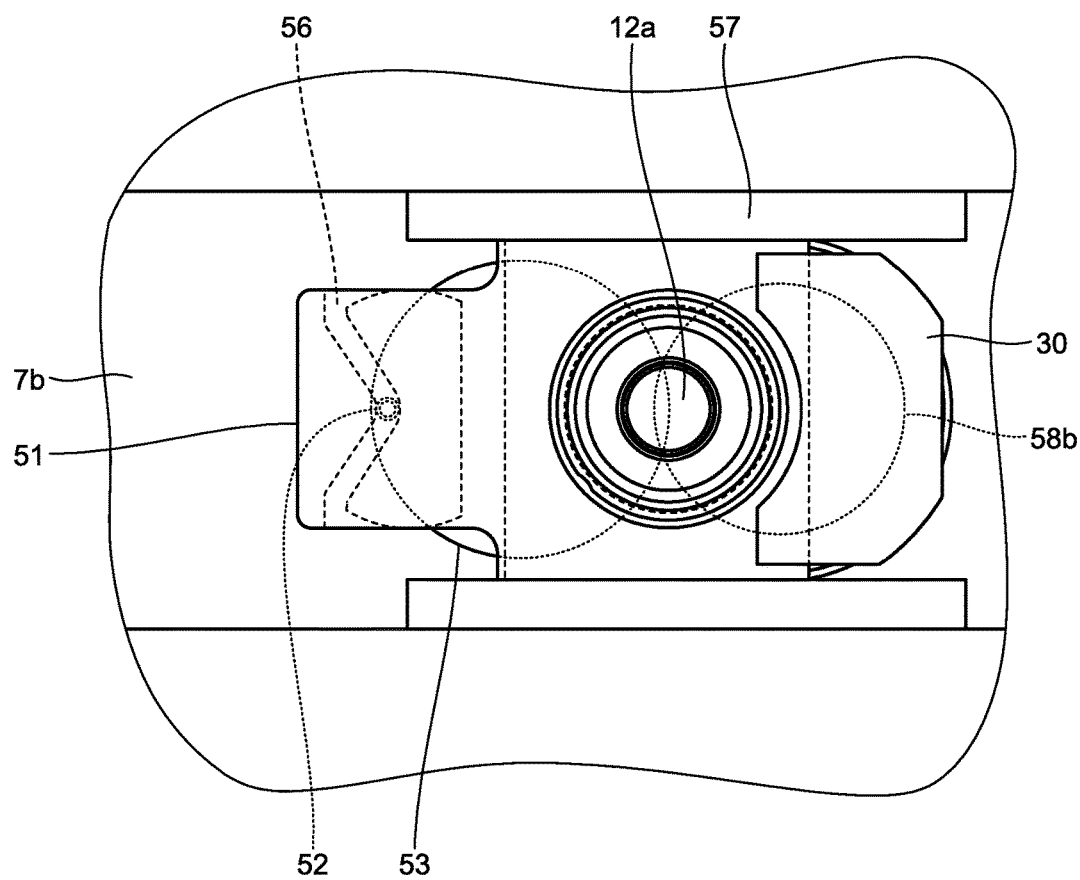
FIG. 16 is a top view of the internal structure of the stage at the position of the turret in FIG. 14.
Figure 17:
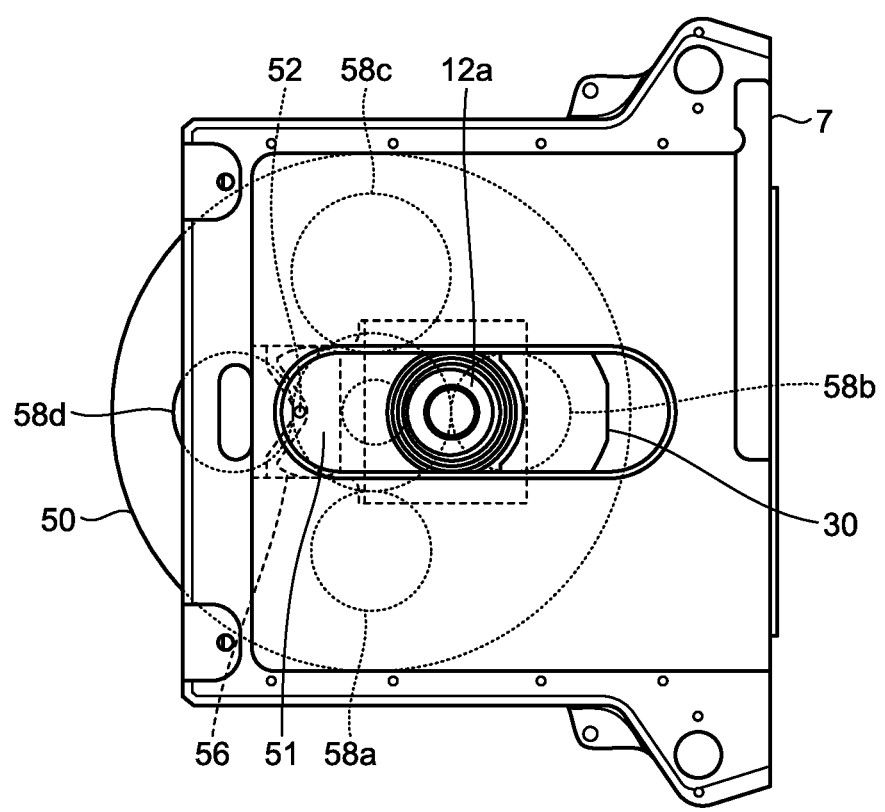
FIG. 17 is a top view of the stage at the position of the turret in FIG. 14.

Next, a second embodiment will be described. FIG. 12 is a partial cross-sectional view illustrating an internal structure of a stage 7 according to the second embodiment of the present invention (a first condenser lens 12a is on an optical axis m). FIG. 13 is a top view of the stage 7 at a position of a turret 50 in FIG. 12. FIG. 14 is a partial cross-sectional view illustrating an internal structure of the stage 7 when the first condenser lens 12a deviates from the optical axis m. FIG. 15 is a perspective view of the internal structure of the stage 7 at the position of the turret 50 in FIG. 14. FIG. 16 is a top view of the internal structure of the stage 7 at the position of the turret 50 FIG. 14. FIG. 17 is a top view of the stage 7 at the position of the turret 50 in FIG. 14.

The turret 50 is connected to a lower side of the stage 7 (a lower stage 7b) on which a specimen S is placed to be arranged in a main body 2 (not illustrated). The stage 7 is held by a pillar portion 2b of the main body 2 (not illustrated).

As illustrated in FIGS. 13 and 17, a plurality of apertures 58a, 58b, 58c and 58d are arranged at equal intervals along the periphery of the turret 50, and optical elements such as a grayscale filter and a polarizing plate are mounted to the apertures 58a, 58b, 58c and 58d in a detachable manner (not illustrated). The optical elements are arranged such that the center of the apertures 58a, 58b, 58c and 58d matches the optical axis m by rotating the turret 50.

As illustrated in FIG. 15, the first condenser lens 12a is disposed on one end of a top surface side of a plate-shaped cam plate 51 (on the back side of the microscope) provided with an M-shaped cam groove 56 at the other end of a rear side (on the front side of the microscope). The cam plate 51 is connected to a top surface of the lower stage 7b via a cam plate guide 57 in a movable manner. A side portion of the cam plate 51 is configured to be fit along the cam plate guide 57, and the cam plate 51 can smoothly move in a horizontal direction (i.e., a front-back direction of the microscope) without looseness.

A light shielding plate 30 made of metal is attached to an end portion of the cam plate 51 on the opposite side to the cam groove 56. The light shielding plate 30 may have the structure of being integrated with the cam plate 51.

As illustrated in FIGS. 12 and 14, a rotating plate 53 is disposed such that a rotation center thereof matches a rotation center R of the turret 50, and the rotating plate 53 rotates along rotation of the turret 50. A top surface of the rotating plate 53 is formed in a disk shape, and a cam pin 52 is fixed to a peripheral portion thereof. The cam pin 52 rotates along rotation of the rotating plate 53. The cam pin 52 is inserted conforming to the cam groove 56 of the cam plate 51, is movable along the cam groove 56, and can cause the cam plate 51, configured to be integrated with the first condenser lens 12a, to perform parallel movement in a direction orthogonal to the optical axis m and in the front-back direction of the microscope.

When the turret 50 and the rotating plate 53 are rotated from a state shown in FIG. 12 where the first condenser lens 12a is arranged on the optical axis m, the first condenser lens 12a deviates from the optical axis m as illustrated in FIG. 14. When the turret and the rotating plate 53 are rotated in the same direction, the cam pin 52, which operates along the cam groove 56, causes the cam plate 51 to move to an original position. Accordingly, the first condenser lens 12a returns onto the optical axis m again.

The first condenser lens 12a disposed on the cam plate 51 moves in parallel along a surface of the lower stage 7b on the lower stage 7b along with the movement of the cam plate 51. At this time, the movement of the apertures 58a, 58b, 58c and 58d caused by the rotation of the turret 50 and the movement of the first condenser lens 12a are in conjunction with each other. The first condenser lens 12a is separated the farthest from the optical axis m so that the light shielding plate 30 covers the optical axis m when the cam pin 52 is positioned to be closest from an optical axis direction of the cam groove 56 (see FIG. 17). On the contrary, when the cam pin 52 reaches the farthest position from the optical axis direction of the cam groove 56 (see FIG. 13), the first condenser lens 12a matches the optical axis m. FIG. 17 illustrates a case where the first condenser lens 12a is separated from the optical axis m. When the light shielding plate 30 covers the optical axis m, it is possible to block incidence of excitation light, which is noise light emitted from an epi-illumination optical system, to a transmitted-light illumination optical system, and to perform favorable fluorescent observation. In particular, the incidence of the excitation light to the transmitted-light illumination optical system becomes a factor that causes a decrease of an S/N ratio of a fluorescent signal at the time of fluorescent observation, and thus, the light shielding plate 30 is indispensable. FIG. 13 illustrates the case where the first condenser lens 12a is arranged on the optical axis m. Through such arrangement, it is possible to perform the general transmitted-light illumination observation.

A coil spring which presses the cam plate 51 at a predetermined pressing position may be arranged on an end face of the cam plate 51 in a longitudinal direction. For example, one end of the coil spring is fixed to the lower stage 7b close to the pillar portion 2b of the main body 2, and the other end thereof is fixed to the end face of the cam plate 51 on the pillar portion 2b side. At this time, the cam pin 52 can cause the cam plate 51 on which the first condenser lens 12a is disposed to smoothly move in parallel without looseness while being grounded on a cam surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
    a stage configured to have a specimen placed thereon;
    an epi-illumination optical system comprising a fluorescence illumination light source configured to irradiate the specimen with excitation light of a predetermined wavelength;
    a transmitted-light illumination optical system comprising:
        a transmitted-light illumination light source comprising a white light emitting diode (LED); and
        a condenser comprising a condenser lens configured to collect light emitted from the transmitted-light illumination light source onto the specimen and configured to move in a direction orthogonal to an illumination optical path so as to be insertable onto and removable from the illumination optical path; and
    a light shielding member configured to move in the direction orthogonal to the illumination optical path along with the condenser lens to block incidence of the excitation light from the epi-illumination optical system to the transmitted-light illumination optical system.

2. The microscope according to claim 1, wherein the condenser lens is a first condenser lens configured to move in the direction orthogonal to the illumination optical path so as to be insertable onto and removable from the illumination optical path; and
    wherein the condenser further comprises a second condenser lens fixed on the illumination optical path.

3. The microscope according to claim 1, further comprising:
    a main body having a pillar portion; and
    a stage holding member for holding the stage,
    wherein:
    the stage comprises:
        an upper stage configured to have the specimen placed thereon; and
        a lower stage held by the pillar portion of the main body via the stage holding member, and
    the condenser lens and the light shielding member are configured to move relative to each other on the lower stage in the direction orthogonal to the illumination optical path.

* * * * *